Aug. 25, 1931.  W. F. KEENAN, JR  1,820,227
FLUID HEATING ELEMENT
Filed March 23, 1927
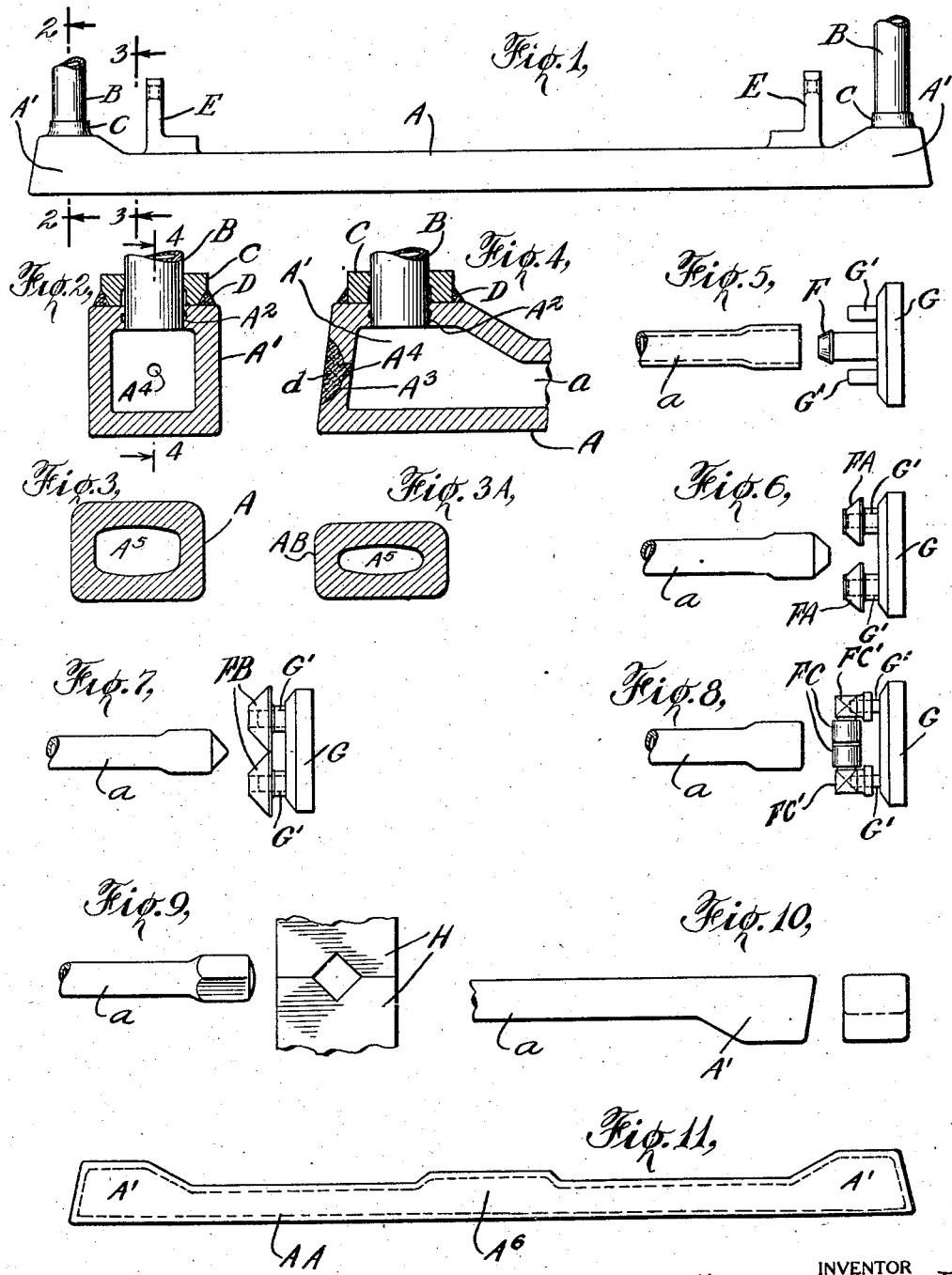
INVENTOR
WALTER F. KEENAN, JR.
BY
John E. Hubbell
ATTORNEY Patented Aug. 25, 1931

1,820,227

UNITED STATES PATENT OFFICE

WALTER F. KEENAN, JR., OF PELHAM, NEW YORK, ASSIGNOR TO FOSTER WHEELER CORPORATION, OF NEW YORK, N. Y., A CORPORATION OF NEW YORK

FLUID HEATING ELEMENT

Application filed March 23, 1927. Serial No. 177,796.

The general object of the present invention is to provide an improved fluid heating element adapted for use in superheating steam, and in heating oil, or for other uses, by the absorption of radiant heat from a highly heated combustion chamber or other relatively high temperature source of radiant heat. Such elements must have relatively massive walls, not only to insure the maintenance of proper strength to resist bursting stresses during a suitably prolonged effective element life notwithstanding the tendency to surface deterioration under the conditions of use, but also because the heat conducting properties of massive walls are essential to a desirable rate and kind of heat transfer to the fluid being heated. Heretofore massive walled radiant heat absorbing elements have been made by shrinking massive blocks of cast iron onto inner wrought steel tubing, and by forming the elements of cast steel. With elements formed by shrinking blocks onto thin walled steel tubes difficulties have been experienced because of the resistance to heat flow across the joints between the inner tubes and the cast iron blocks, even when those joints are tight, and also because the joints between the tubes and casing blocks frequently become loose under the severe conditions of use. The use of cast steel elements is open to the objection that the cost of production is unduly high, particularly as it is not feasible to cast one-piece elements as long as are required by practical considerations and it is difficult and expensive to satisfactorily unite the ends of the cast steel sections of the element formed of a plurality of such section. Furthermore, it is practically difficult or impossible to form cast steel elements with flow passages therethrough sufficiently smooth and uniform to avoid objectionable friction loss or pressure drop in the elements.

I have discovered that it is practically feasible and desirable to form such elements out of suitably thick walled seamless tube blanks by welding and forging operations of the character hereinafter set forth, and my invention consists not only in the elements constructed as herein described and illustrated, but also in the method employed in the construction of such elements.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is an elevation of an element constructed in accordance with the present invention;

Fig. 2 is a section on the line 2—2 of Fig. 1;

Fig. 3 is a section on the line 3—3 of Fig. 1;

Fig. 3A is a section taken similarly to Fig. 3 of an element of different cross section;

Fig. 4 is a partial longitudinal section taken on the line 4—4 of Fig. 2;

Figs. 5 to 10 are views diagrammatically illustrating steps in the method of forming the element shown in Fig. 1 out of a cylindrical seamless thick walled tube; and Fig. 11 is an elevation of an element of modified form.

The cross section of the body portion of the finished element A shown in Figs. 1, 2, 3 and 4, is rectangular in form, except that it is more or less rounded at its corners and the element wall is of approximately uniform thickness, except as it is thickened adjacent the corners of the element. At each end A', the element is enlarged, with a corresponding enlargement of the end portions of the channel $A^s$ in the element.

In the particular construction illustrated a lateral opening $A^2$ is formed in the wall of each enlarged end portion A' at the rear side of the element; that is, at the side opposite the heat absorbing face of the element. The end connections B communicate with the channel $a$ in the element A through the openings $A^2$ in which the end connections B are ordinarily expanded to secure them in place and insure tight joints. To strengthen the joints between the end connections B and the element A, the rear walls of the end portions A' of the latter are thickened ordinarily and as illustrated by welding pad or ring-like parts C to the element. The welding operation is preferably carried out by means of an acetylene torch and results in the formation of a fillet of the welding metal D integrally connected to the element and pad C at the outer edge of each welded joint.

When formed as hereinafter described, each end wall of the portion of the element formed by the tubular blank contains a saucer-like concavity $A^3$ usually communicating at its bottom with the passage $a$ through a small opening $A^4$ which may be more or less irregular. The cavities $A^3$, and the openings $A^4$ when the latter are present, are filled, and the end walls of the element are thereby made sufficiently thick and strong, by a suitable welding operation, ordinarily performed with an acetylene torch, by which said cavities and openings are filled with welding material $d$ applied in a molten condition and puddled into place and forming an integral part of the finished element. Ordinarily supporting brackets E are welded to the rear side of the element, in the same general manner in which the pad or washer parts C are welded in place.

In a preferred mode of forming an element in accordance with the present invention I start with a seamless tube blank $a$ usually of mild steel, and having a wall thickness and a length approximating that of the finished element. Such a tube may be twenty feet long with an external diameter of four and one-half inches and a wall thickness of three-quarters of an inch. It will be understood, of course, that the foregoing dimensions are given by way of illustrative example, and that the invention is not limited to such tube blank dimensions. The tube blank $a$ is first heated to bring one end approximately to a welding temperature, and the heated end is then expanded into the form shown in Fig. 5. In practice this end expansion may be effected by what is essentially a spinning operation, carried out by means of a rotating conical tool F forced into the end of the blank $a$ while the tool is being rotated at a suitable speed. In practice the tool F may well be coaxial with and removably carried by the rotatable head G of a machine of the type well known as a Van Stone machine. After an end portion of the element has thus been enlarged, the end of the enlarged end portion is more or less completely closed by the operation of suitable spinning tools which may comprise a pair of tapered rolls FA shown in Fig. 6, and a second pair of rolls FB shown in Fig. 7 and operating on the tube end after the rolls FA have performed their function, the rolls FB being larger in diameter and more tapered than the rolls FA. The rolls FA and FB may well be successively mounted on the spindles G' of the head G of the Van Stone machine. The end wall of the enlarged element end is then flattened as by pressing it against rolls FC journalled in bearings FC' removably mounted on the spindles G' of the head G.

After the tube blank end is thus expanded and more or less closed, the enlarged end is off-set with respect to the body of the blank, and it and the portion of the blank body adjacent the expanded end are given their rectangular form. In thus shaping up the expanded end I advantageously first square the expanded end with a power hammer provided with work engaging parts H as shown in Fig. 9. If this unduly bulges the closed end as indicated in Fig. 9, the end flattening operation of Fig. 8 may then be repeated. To off-set the expanded end and to give the rectangular form to the body of the blank, I subject the latter to the action of a hydraulic or analogous forging press having suitably shaped work holding and work forging parts, which need not be illustrated or described in detail as those skilled in the art will readily understand how to provide and use such parts.

After one end and a portion of the body of the blank have been subjected to the operations described above, the other end of the blank is expanded, has its end closed, and it and the remaining portion of the blank are shaped by repeating the operations previously described.

After the blank is thus forged into shape, the cavities $A^3$ and the opening $A^4$ are filled with welding material, and the pad or washer parts C and the supporting parts E are welded to the blank in the manner previously described. After the completion or in the course of the operations, the blank is subjected to the straightening operation above described when necessary, and the blank is heated and reheated as conditions make desirable at intervals as the various forging operations are being carried out. Ordinarily the openings $A^2$ in the blank body and in the washer parts C of the element are reamed out to receive the tube connections B to be expanded in place therein after the forging, shaping and welding operations are completed.

Instead of reducing the entire body of the blank to rectangular cross section as shown in Fig. 1, one or more intermediate portions of the blank body may be less flattened than the remainder of the blank body. For example, as shown in Fig. 11, a central portion $A^6$ of the element AA is larger in the direction transverse to the heat absorbing face of the element than the major portion of the element body. This gives increased cross-sectional area to the element channel in the portion $A^6$ which may be desirable as for the application of a soot blowing attachment of certain type.

In forming elements in the manner described, the forging operations by which the body portion of each element is given its rectangular cross section are preferably carried out so as to minimize the elongation of the blank by such operation, and in practice, the long side of the rectangle as seen in Fig. 3, is but little less than the original diameter of the blank $a$. For example, if the initial blank diameter is four and one-half inches the long side of the rectangle as seen in Fig. 3 may well be four and three-eighths inches, and with the dimensions hereinbefore given by way of example, the elongation of the body of the blank produced in the forging operations by which it is given its rectangular shape is ordinarily about one-quarter inch per lineal foot of length.

A practical advantage of the invention is that elements having very different flow capacities can be produced from the same standard blank with no change in the operations described above except in the extent to which the blank is flattened. For example, the element AB shown in Fig. 3A may be made from a blank identical in cross section with that from which the element A shown in Fig. 3 is made, and by following exactly the same steps except that the body of the blank is flattened more in forging the body of the element AB than it is in forming the body of the element A. As shown, the cross sectional area of the channel $A^5$ in the element AB is exactly one-half the cross sectional area of the channel $A^5$ in the element A. Aside from the change in the channel cross sectional area, the effect of the increased flattening to which the blank forming element AB is subjected, gives increased metal thickness at the corners of the element and makes the element channel less rectangular and more elliptical in cross section, but these changes in shape are of no particular consequence. Numerous flow passage cross sectional areas intermediate those of the elements A and AB may be, and in practice are produced from blanks of the same initial cross section. This capacity to produce elements of definitely different flow capacities from similar blanks and with practically no change in the operations required except in the extent of the flattening to which the bodies of the elements are subjected, constitutes an important practical advantage of the invention, and has the ultimate practical result of facilitating, and cheapening the cost of production of radiant heat absorbing elements suitable for different conditions of use.

The novel method of making a thick walled fluid heating element disclosed, but not claimed herein, is disclosed and claimed in my divisional application, Serial No. 285,625, filed June 15, 1928 which has since matured as Patent No. 1,764,174, granted June 17, 1930.

While in accordance with the provisions of the statutes I have illustrated and described the best form of my invention now known to me, it will be apparent to those skilled in the art that changes in the form of the constructions and modes of operation herein described and illustrated may be made without departing from the spirit of my invention as set forth in the appended claims, and that certain features of my invention may sometimes be used with advantage without a corresponding use of other features.

Having now described my invention, what I claim as new and desire to secure by Letters Patent is:

1. A new article of manufacture consisting of a tubular fluid heating element made of wrought metal and having its end portions internally and externally enlarged to provide suitable spaces for the introduction and discharge of the fluid heated from and into transverse end connections and having integral portions closing the outer end of said spaces and having end connection openings in said enlarged portions and having parts welded to said end portions to thicken the portions of the wall thereof surrounding said openings.

2. A new article of manufacture consisting of a fluid heating element made out of a thick walled wrought metal tube blank by forging, shaping and welding operations giving said element a rectangular cross section, internally and externally enlarged end portions and integral end closing walls.

3. A new article of manufacture consisting of a thick walled tubular fluid heating element integrally formed of wrought metal and having an extensive wall portion flattened at its outer side to provide a heat absorbing surface adapted for exposure to a high temperature source of radiant heat.

4. A new article of manufacture consisting of a thick walled tubular fluid heating element integrally formed of wrought metal and substantially rectangular in transverse cross section.

5. A new article of manufacture consisting of a one-piece thick walled tubular fluid heating element integrally formed of wrought metal and internally and externally enlarged at its ends.

6. A new article of manufacture consisting of a thick walled tubular fluid heating element integrally formed of wrought metal and having its end portions internally and externally enlarged, conduits connected to the rear side of the spaces so formed for the introduction and discharge of the fluid being heated and integral end portions closing the outer ends of said spaces.

7. An article of manufacture consisting of a one-piece thick walled tubular fluid heat element integrally formed of wrought metal and having an extensive wall portion flattened at its outer side to provide a heat absorbing surface adapted for exposure to a high temperature source of radiant heat, and conduit connections to the end portions of said element for the introduction and discharge of the fluid to be heated.

Signed at New York city, in the county of New York, and State of New York, this 19th day of March, A. D. 1927.

WALTER F. KEENAN, Jr.